US012489204B2

(12) United States Patent
Li et al.

(10) Patent No.: US 12,489,204 B2
(45) Date of Patent: Dec. 2, 2025

(54) INTEGRATED MULTI-FEED ANTENNA

(71) Applicant: Industrial Technology Research Institute, Hsinchu (TW)

(72) Inventors: Wei-Yu Li, Hsinchu (TW); Wei Chung, Hsinchu County (TW); Kin-Lu Wong, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 203 days.

(21) Appl. No.: 18/395,750

(22) Filed: Dec. 26, 2023

(65) Prior Publication Data

US 2025/0210857 A1 Jun. 26, 2025

(51) Int. Cl.

*H01Q 5/35* (2015.01)
*H01Q 1/36* (2006.01)
*H01Q 1/50* (2006.01)
*H01Q 9/04* (2006.01)

(52) U.S. Cl.

CPC ................. *H01Q 1/50* (2013.01); *H01Q 1/36* (2013.01)

(58) Field of Classification Search

CPC ............ H01Q 1/243; H01Q 1/36; H01Q 1/50; H01Q 5/10; H01Q 5/342; H01Q 5/35; H01Q 5/307; H01Q 9/04; H01Q 9/045; H01Q 9/0457; H01Q 9/0464

See application file for complete search history.

(56) References Cited

U.S. PATENT DOCUMENTS

| | | | |
|---|---|---|---|
| 4,460,899 | A | 7/1984 | Schmidt et al. |
| 5,241,321 | A | 8/1993 | Tsao |
| 5,952,983 | A | 9/1999 | Dearnley et al. |
| 5,990,838 | A | 11/1999 | Burns et al. |
| 6,008,763 | A | 12/1999 | Nystrom et al. |

(Continued)

FOREIGN PATENT DOCUMENTS

| | | |
|---|---|---|
| CN | 112290193 | 1/2021 |
| CN | 115882191 | 3/2023 |

(Continued)

OTHER PUBLICATIONS

J. C. Coetzee et al., "Compact Multiport Antenna With Isolated Ports", Microwave and Optical Technology Letters, Jan. 2006, pp. 229-232.

(Continued)

*Primary Examiner* — Thai Pham
(74) *Attorney, Agent, or Firm* — JCIPRNET

(57) ABSTRACT

The disclosure provides an integrated multi-feed antenna, including a first conductor layer, a second conductor layer, and multiple feeding conductor lines. The second conductor layer has a first center position. The second conductor layer has a closed slit structure. The closed slit structure surrounds the first center position to encircle forming a center region. The second conductor layer is spaced apart from the first conductor layer at a first interval. Each of the feeding conductor lines has one end electrically connected or electrically coupled to the second conductor layer, and each has another end electrically connected to a signal source. Each of the feeding conductor lines excites the second conductor layer to generate at least one resonant mode. The resonant modes cover at least one identical wireless communication band.

19 Claims, 8 Drawing Sheets

(56) References Cited

U.S. PATENT DOCUMENTS

| | | | |
|---|---|---|---|
| 6,104,348 A | 8/2000 | Karlsson et al. | |
| 6,288,679 B1 | 9/2001 | Fischer et al. | |
| 6,344,829 B1 | 2/2002 | Lee | |
| 6,426,723 B1 | 7/2002 | Smith et al. | |
| 7,250,910 B2 | 7/2007 | Yoshikawa et al. | |
| 7,271,777 B2 | 9/2007 | Yuanzhu | |
| 7,330,156 B2 | 2/2008 | Arkko et al. | |
| 7,352,328 B2 | 4/2008 | Moon et al. | |
| 7,385,563 B2 | 6/2008 | Bishop | |
| 7,405,699 B2 | 7/2008 | Qin | |
| 7,423,595 B2 | 9/2008 | Saily | |
| 7,460,069 B2 | 12/2008 | Park et al. | |
| 7,498,997 B2 | 3/2009 | Moon et al. | |
| 7,541,988 B2 | 6/2009 | Sanelli et al. | |
| 7,561,110 B2 | 7/2009 | Chen | |
| 7,573,433 B2 | 8/2009 | Qin | |
| 7,586,445 B2 | 9/2009 | Qin et al. | |
| 7,609,221 B2 | 10/2009 | Chung et al. | |
| 7,688,273 B2 | 3/2010 | Montgomery et al. | |
| 7,710,343 B2 | 5/2010 | Chiu et al. | |
| 7,714,789 B2 | 5/2010 | Tsai et al. | |
| 7,733,285 B2 | 6/2010 | Gainey et al. | |
| 9,520,655 B2 | 12/2016 | Cerreno | |
| 9,972,899 B2 | 5/2018 | Jan et al. | |
| 10,044,111 B2 | 8/2018 | Murdock et al. | |
| 2009/0322639 A1 | 12/2009 | Lai | |
| 2010/0134377 A1 | 6/2010 | Tsai et al. | |
| 2010/0156745 A1 | 6/2010 | Andrenko et al. | |
| 2010/0156747 A1 | 6/2010 | Montgomery | |
| 2010/0238079 A1 | 9/2010 | Ayatollahi et al. | |
| 2010/0295736 A1 | 11/2010 | Su | |
| 2010/0295750 A1 | 11/2010 | See et al. | |
| 2015/0255875 A1 | 9/2015 | Jan et al. | |
| 2015/0311594 A1 | 10/2015 | Zhu et al. | |
| 2020/0350690 A1* | 11/2020 | Hsiao | H01Q 1/243 |
| 2020/0381835 A1 | 12/2020 | Chou et al. | |
| 2021/0203080 A1* | 7/2021 | Wong | H01Q 21/28 |
| 2021/0304949 A1* | 9/2021 | Sullivan | H01F 27/2804 |
| 2023/0198148 A1* | 6/2023 | Wong | H01Q 1/36<br>343/702 |

FOREIGN PATENT DOCUMENTS

| | | |
|---|---|---|
| TW | 519778 | 2/2003 |
| TW | 202327174 | 7/2023 |
| WO | 2016112839 | 7/2016 |

OTHER PUBLICATIONS

Yuan Ding et al., “A Novel Dual-Band Printed Diversity Antenna for Mobile Terminals”, IEEE Transactions on Antennas and Propagation, Jul. 2007, pp. 2088-2096.

Jonathan Ethier et al., “MIMO Handheld Antenna Design Approach Using Characteristic Mode Concepts”, Microwave and Optical Technology Letters, Jul. 2008, pp. 1724-1727.

Saou-Wen Su et al., “Printed Coplanar Two-Antenna Element for 2.4/5 GHz WLAN Operation in a MIMO System”, Microwave and Optical Technology Letters, Jun. 2008, pp. 1635-1638.

Shin-Chang Chen et al., “A Decoupling Technique for Increasing the Port Isolation Between Two Strongly Coupled Antennas”, IEEE Transactions on Antennas and Propagation, Dec. 2008, pp. 3650-3658.

Yaxing Cai et al., “A Novel Wideband Diversity Antenna for Mobile Handsets”, Microwave and Optical Technology Letters, Jan. 2009, pp. 218-222.

Ting-Wei Kang et al., “Isolation Improvement of 2.4/5.2/5.8 GHz WLAN Internal Laptop Computer Antennas Using Dual-Band Strip Resonator as a Wavetrap”, Microwave and Optical Technology Letters, Jan. 2010, pp. 58-64.

Saou-Wen Su, “Concurrent Dual-Band Six-Loopantenna System With Wide 3-dB Beamwidth Radiation for MIMO Access Points”, Microwave and Optical Technology Letters, Jun. 2010, pp. 1253-1258.

Hongpyo Bae et al., “Compact Mobile Handset MIMO Antenna for LTE700 Applications”, Microwave and Optical Technology Letters, Nov. 2010, pp. 2419-2422.

Minseok Han et al., “MIMO Antenna Using a Decoupling Network for 4G USB Dongle Application”, Microwave and Optical Technology Letters, Nov. 2010, pp. 2551-2554.

Dongho Kim et al., “Design of a Dual-Band MIMO Antenna for Mobile WiMAX Application”, Microwave and Optical Technology Letters, Feb. 2011, pp. 410-414.

Chao-Ming Luo et al., “Isolation Enhancement of a Very Compact UWB-MIMO Slot Antenna With Two Defected Ground Structures”, IEEE Antennas and Wireless Propagation Letters, Apr. 15, 2015, pp. 1766-1769.

Gunjan Srivastava et al., “Compact MIMO Slot Antenna for UWB Applications”, IEEE Antennas and Wireless Propagation Letters, Oct. 16, 2015, pp. 1057-1060.

Peng Gao et al., “Compact Printed UWB Diversity Slot Antenna With 5.5-GHz Band-Notched Characteristics”, IEEE Antennas and Wireless Propagation Letters, Feb. 14, 2014, pp. 376-379.

Reza Karimian et al., “Novel F-Shaped Quad-Band Printed Slot Antenna for WLAN andWiMAXMIMO Systems”, IEEE Antennas and Wireless Propagation Letters, Mar. 11, 2013, pp. 405-408.

Yan-Yan Liu et al., “Compact Differential Band-Notched Stepped-Slot UWB-MIMO Antenna With Common-Mode Suppression”, IEEE Antennas and Wireless Propagation Letters, Jul. 18, 2016, pp. 593-596.

Julien Sarrazin et al., “Investigation on Cavity/Slot Antennas for Diversity and MIMO Systems: The Example of a Three-Port Antenna”, IEEE Antennas and Wireless Propagation Letters, May 30, 2008, pp. 414-417.

Qingyuan Liu et al., “A Compact Wideband Planar Diversity Antenna for Mobile Handsets”, Microwave and Optical Technology Letters, Jan. 2008, pp. 87-91.

Jung-Hwan Choi et al., “Performance Evaluation of 2 X 2 MIMO Handset Antenna Arrays for Mobile WiMAX Applications”, Microwave and Optical Technology Letters, Jun. 2009, pp. 1558-1561.

Jui-Hung Chou et al., “Internal Wideband Monopole Antenna for MIMO Access-Point Applications in the WLAN/WIMAX Bands”, Microwave and Optical Technology Letters, May 2008, pp. 1146-1148.

Saou-Wen Su, “A Three-In-One Diversity Antenna System for 5 Ghz Wlan Applications”, Microwave and Optical Technology Letters, Oct. 2009, pp. 2477-2481.

Kasra Payandehjoo et al., “Employing EBG Structures in Multiantenna Systems for Improving Isolation and Diversity Gain”, IEEE Antennas and Wireless Propagation Letters, Oct. 20, 2009, pp. 1162-1165.

Le Kang et al., “Compact Offset Microstrip-Fed MIMO Antenna for Band-Notched UWB Applications”, IEEE Antennas and Wireless Propagation Letters, Apr. 13, 2015, pp. 1754-1757.

Peng Gao et al., “A Compact UWB and Bluetooth Slot Antenna for MIMO/Diversity Applications”, ETRI Journal, Apr. 2014, pp. 309-312.

Mohammad S. Sharawi et al., “A Two Concentric Slot Loop Based Connected Array MIMO Antenna System for 4G/5G Terminals”, IEEE Transactions on Antennas and Propagation, Dec. 2017, pp. 6679-6686.

Da Qing Liu et al., “An Extremely Low-Profile Wideband MIMO Antenna for 5G Smartphones”, IEEE Transactions on Antennas and Propagation, Sep. 2019, pp. 5772-5780.

Biao Li et al., “Wideband Dual-Polarized Patch Antenna With Low Cross Polarization and High Isolation”, IEEE Antennas and Wireless Propagation Letters, Apr. 18, 2012, pp. 427-430.

“Office Action of Taiwan Counterpart Application”, issued on Jan. 8, 2025, p. 1-p. 6.

* cited by examiner

INTEGRATED MULTI-FEED ANTENNA

TECHNICAL FIELD

The disclosure relates to a multi-feed antenna design, and more particularly, to a multi-feed antenna architecture that may achieve high integration.

BACKGROUND

In order to improve wireless communication quality and data transmission rate, applications of MIMO (Multi-Input Multi-Output System) multi-antenna arrays, pattern-variable multi-antenna array architectures, and high-gain multi-antenna arrays have become popular. Therefore, a multi-antenna co-joined design with an advantage of high integration has become one of popular research topics. However, how to successfully design a broadband antenna unit into a highly integrated multi-antenna array while achieving advantages of good matching and good isolation is a technical challenge that is not easy to overcome.

When multiple antennas operating in the same frequency band are integrated into an antenna array, mutual coupling interference may occur. As a result, isolation between multi-antenna feeding ports becomes worse, which in turn leads to attenuation of radiation characteristics and antenna efficiency, and also causes a decrease in the data transmission rate, making it more difficult to implement multi-antenna integration. Some previous technical documents have proposed methods by designing resonant structures on the ground area between multi-antennas as a coupling energy isolator to improve the energy isolation between the antennas. However, such a design method may cause additional coupling currents to be excited, increasing correlation coefficients between the antennas. It may also increase an overall size of the multi-antenna array, causing instability during manufacturing process and thus increasing mass production costs. Therefore, it is not easy to be widely implemented in various communication equipments or devices.

Therefore, a design method for a highly integrated antenna array that may solve the above issues is required, so as to meet requirements for practical applications of future wireless communication devices or equipment supporting high data rate transmission.

SUMMARY

In view of the above, an embodiment of the disclosure discloses an integrated multi-feed antenna. Some practical implementations based the embodiments may solve the above technical issues.

According to an embodiment, the disclosure provides an integrated multi-feed antenna. The multi-feed antenna array includes a first conductor layer, a second conductor layer, and a plurality of feeding conductor lines. The second conductor layer has a first center position. The second conductor layer has a closed slit structure. The closed slit structure surrounds the first center position to encircle forming a center region. The second conductor layer is spaced apart from the first conductor layer at a first interval. Each of the feeding conductor lines has one end electrically connected or electrically coupled to the second conductor layer, and each has another end electrically connected to a signal source. Each of the feeding conductor lines excites the second conductor layer to generate at least one resonant mode. The resonant modes cover at least one identical wireless communication band.

In order for the above and other contents of the disclosure to be more comprehensible, embodiments accompanied with drawings are described in detail below.

DETAILED DESCRIPTION OF DISCLOSED EMBODIMENTS

Figure 1A:
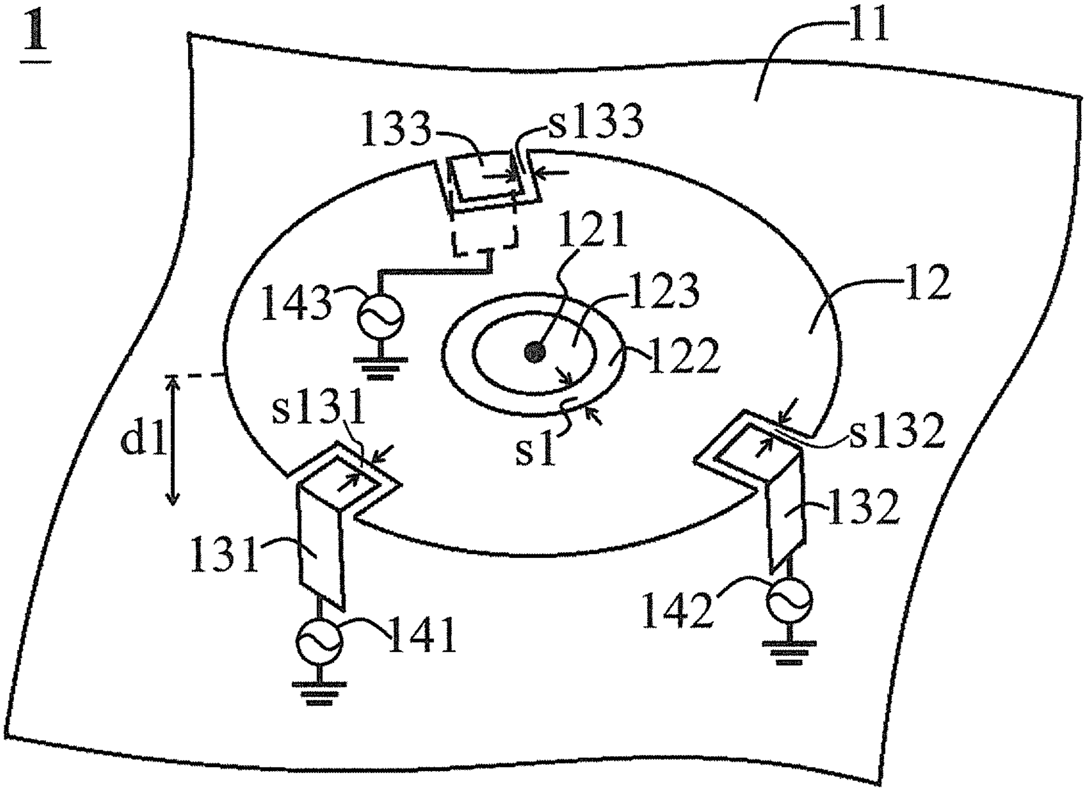
FIG. 1A is a structural diagram of an integrated multi-feed antenna 1 according to an embodiment of the disclosure.
Figure 1B:
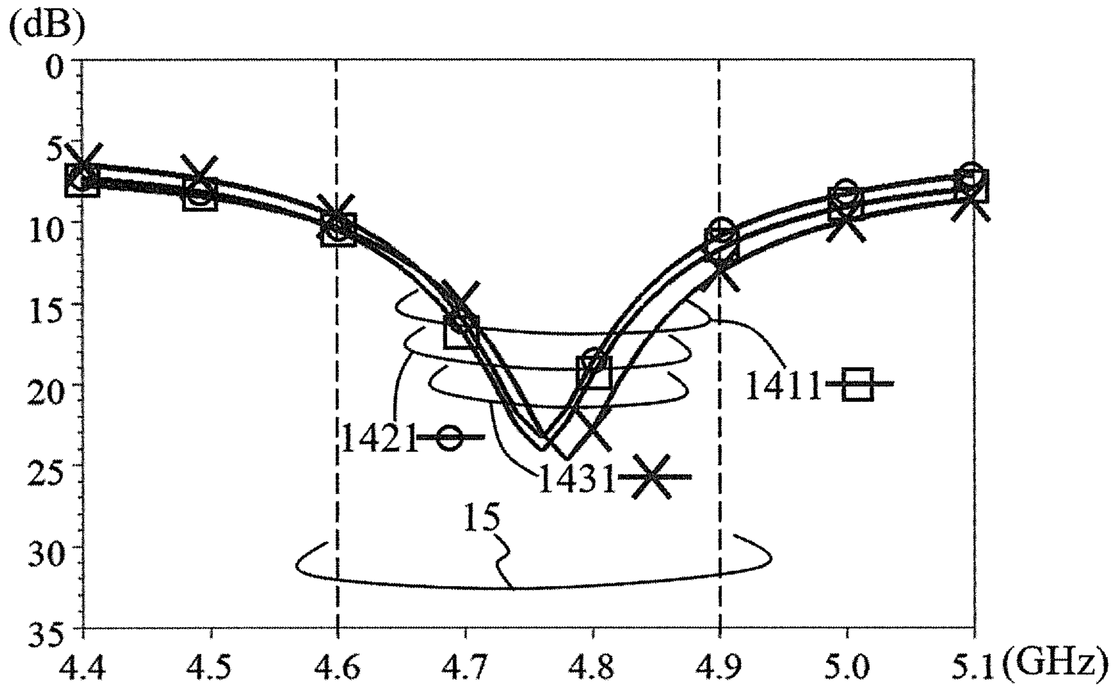
FIG. 1B is a curve diagram of return loss of the integrated multi-feed antenna 1 according to an embodiment of the disclosure.

FIG. 1A is a structural diagram of an integrated multi-feed antenna 1 according to an embodiment of the disclosure. As shown in FIG. 1A, the integrated multi-feed antenna 1 includes a first conductor layer 11, a second conductor layer 12, and a plurality of feeding conductor lines 131, 132, and 133. The second conductor layer 12 has a first center position 121. The second conductor layer 12 also has a closed slit structure 122. The closed slit structure 122 surrounds the first center position 121 to encircle forming a center region 123. The second conductor layer 12 is spaced apart from the first conductor layer 11 at a first interval d1. Each of the feeding conductor lines 131, 132, and 133 has one end electrically coupled to the second conductor layer 12, and each has another end electrically connected to signal sources 141, 142, and 143. Each of the feeding conductor lines 131, 132, and 133 excites the second conductor layer 12 to generate at least one resonant mode 1411, 1421, and 1431 (as shown in FIG. 1B). The resonant modes 1411, 1421, and 1431 cover at least one identical wireless communication band 15 (as shown in FIG. 1B).

Figure 4:
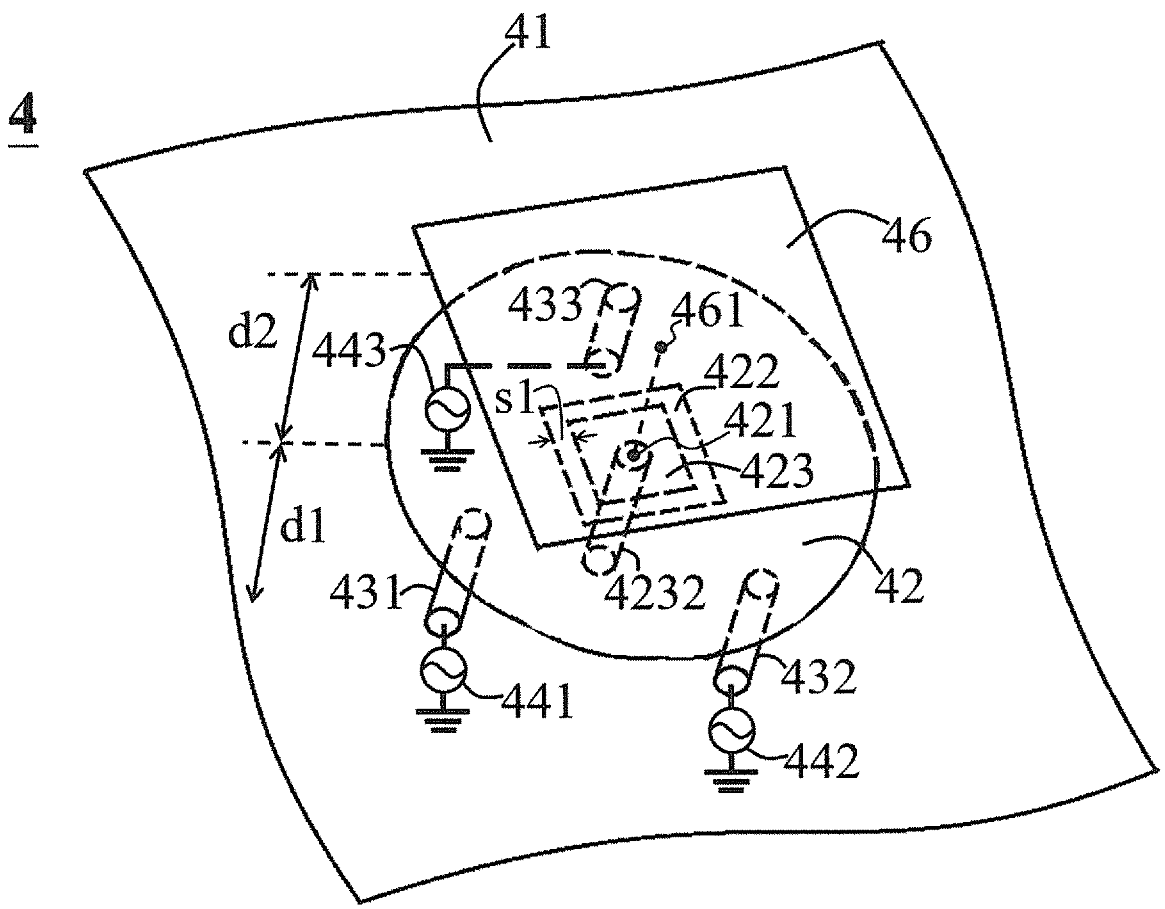
FIG. 4 is a structural diagram of an integrated multi-feed antenna 4 according to an embodiment of the disclosure.

The closed slit structure 122 has a slit interval s1. The slit interval s1 is between 0.001 wavelength and 0.08 wavelength of a lowest operating frequency of the wireless communication band 15 (as shown in FIG. 1B, 4.6 GHz to 4.9 GHZ). An area of the center region 123 is less than an area of the second conductor layer 12, and the area of the center region 123 is between 0.01 times and 0.43 times the area of the second conductor layer 12. The area of the second conductor layer 12 is less than an area of the first conductor layer 11, and the area of the second conductor layer 12 is between 0.13 wavelength squared and 0.79 wavelength squared of the lowest operating frequency of the wireless communication band 15. The area of the center region 123 is between 0.018 wavelength squared and 0.35 wavelength squared of the lowest operating frequency of the wireless communication band 15. The number of feeding conductor lines 131, 132, and 133 is three. The number of feeding conductor lines 131, 132, and 133 is greater than 1 and less than or equal to 5. The feeding conductor lines 131, 132, and 133 are located between the first conductor layer 11 and the second conductor layer 12. Each of the feeding conductor lines 131, 132, and 133 has one end electrically coupled to the second conductor layer 12, and there are coupling intervals s131, s132, and s133 between each of the feeding conductor lines 131, 132, and 133 and the second conductor layer 12. The coupling intervals s131, s132, and s133 are between 0.005 wavelength and 0.19 wavelength of the lowest operating frequency of the wireless communication band 15. The first interval d1 is between 0.0023 wavelength and 0.29 wavelength of the lowest operating frequency of the wireless communication band 15. The signal sources 141, 142, and 143 are transmission lines, impedance matching circuits, amplifier circuits, feeding networks, switch circuits, connector components, filter circuits, integrated circuit chips, or radio frequency front-end modules. In practical applications, the integrated multi-feed antenna 1 may be manufactured and assembled using, but is not limited to, a circuit board process, a conductor cutting process, a plastic injection molding process, and a plastic metallization process. The integrated multi-feed antenna 1 may be provided with multiple sets to form an integrated multi-feed antenna array, which may be applied to multi-input multi-output antenna systems, pattern switching antenna systems, or beam forming antenna systems, or increase radiating gain through electrical connection of transmission lines or radio frequency feeding networks.

Figure 1C:
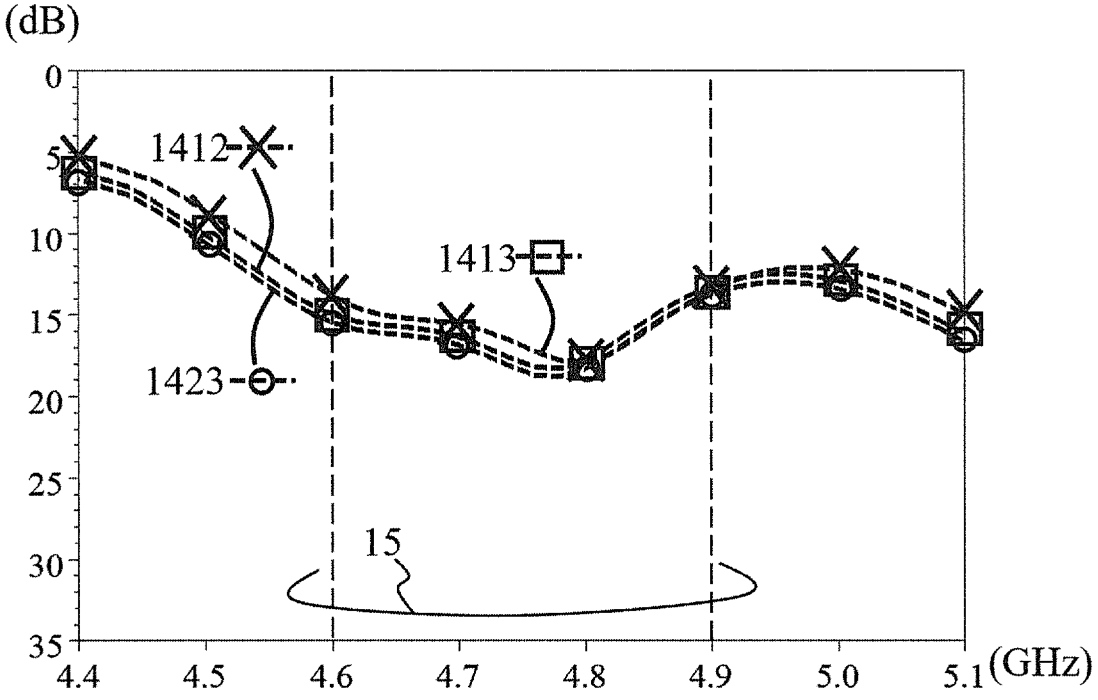
FIG. 1C is a curve diagram of isolation of the integrated multi-feed antenna 1 according to an embodiment of the disclosure.

In FIG. 1A, in the integrated multi-feed antenna 1 according to an embodiment of the disclosure, the second conductor layer 12 is designed to have the closed slit structure 122, and the closed slit structure 122 is designed to surround the first center position 121 to encircle and form the center region 123. The closed slit structure 122 is designed to have the slit interval s1. The slit interval s1 is between 0.001 wavelength and 0.08 wavelength of the lowest operating frequency of the wireless communication band 15 (as shown in FIG. 1B, 4.6 GHz to 4.9 GHZ), which may effectively suppress an energy coupling level of resonant currents at the second conductor layer 12 excited by the feeding conductor lines 131, 132, and 133 in, and successfully achieve good isolation between the resonant modes 1411, 1421, and 1431 (as shown in FIG. 1C), achieving technical effects of co-construction and integration of the multiple signal sources. In addition, the area of the center region 123 is designed to be between 0.01 times and 0.43 times the area of the second conductor layer 12. The area of the center region 123 is designed to be between 0.018 wavelength squared and 0.35 wavelength squared of the lowest operating frequency of the wireless communication band 15. Hence, the input impedance between the feeding conductor lines 131, 132, and 133 and the second conductor layer 12 may be optimized to successfully achieve a good impedance matching level of the resonant modes 1411, 1421, and 1431 (as shown in FIG. 1B). Therefore, the integrated multi-feed antenna 1 according to an embodiment of the disclosure may achieve a technical effect of multi-antenna compatible integration. The integrated multi-feed antenna 1 may be provided with a plurality of sets to form an integrated multi-feed antenna array, which may be applied to multi-input multi-output antenna systems, pattern switching antenna systems, or beam forming antenna systems, or increase radiating gain through electrical connection of transmission lines or radio frequency feeding networks.

FIG. 1B is a curve diagram of return loss of the integrated multi-feed antenna 1 according to an embodiment of the disclosure. The conductor cutting process is selected for implementation of production and assembly, and conducts experiments with the following dimensions. A distance of the slit interval s1 is about 0.89 mm. A distance of the first interval d1 is about 8.3 mm. The area of the center region 123 is approximately 15.2 $mm^2$. The area of the second conductor layer 12 is approximately 641.1 $mm^2$. Distances of the coupling intervals s131, s132, and s133 are all approximately 1.6 mm. As shown in FIG. 1B, each of the feeding conductor lines 131, 132, and 133 successfully excites the second conductor layer 12 to generate the at least one resonant mode 1411, 1421, and 1431 with good impedance matching (as shown in FIG. 1B), covering the at least one identical wireless communication band 15 (as shown in FIG. 1B, 4.6 GHz to 4.9 GHz). In this embodiment, a frequency range of the wireless communication band 15 is 4.6 GHz to 4.9 GHZ, and the lowest operating frequency of the first communication band 15 is 4.6 GHz. FIG. 1C is a curve diagram of isolation of the integrated multi-feed antenna 1 according to an embodiment of the disclosure. As shown in FIG. 1C, a curve of isolation between the signal source 141 and the signal source 142 is 1412, a curve of isolation between the signal source 141 and the signal source 143 is 1413, and a curve of isolation between the signal source 142 and the signal source 143 is 1423. As shown in FIG. 1D, good isolation may be achieved between the multiple signal source 141 and signal sources 142 and 143 of the integrated multi-feed antenna 1.

The operation of the communication band and experimental data covered in FIGS. 1B and 1C are only for the purpose of experimentally proving technical effects of the integrated multi-feed antenna 1 according to an embodiment of the disclosure in FIG. 1A. It is not used to limit the operation of the communication band, applications, and specifications that the integrated multi-feed antenna 1 in the disclosure may cover in the practical applications. The integrated multi-feed antenna may be provided with multiple sets to form an integrated multi-feed antenna array, which may be applied to multi-input multi-output antenna systems, pattern switching antenna systems, or beam forming antenna systems, or increase radiating gain through electrical connection of transmission lines or radio frequency feeding networks.

Figure 2A:
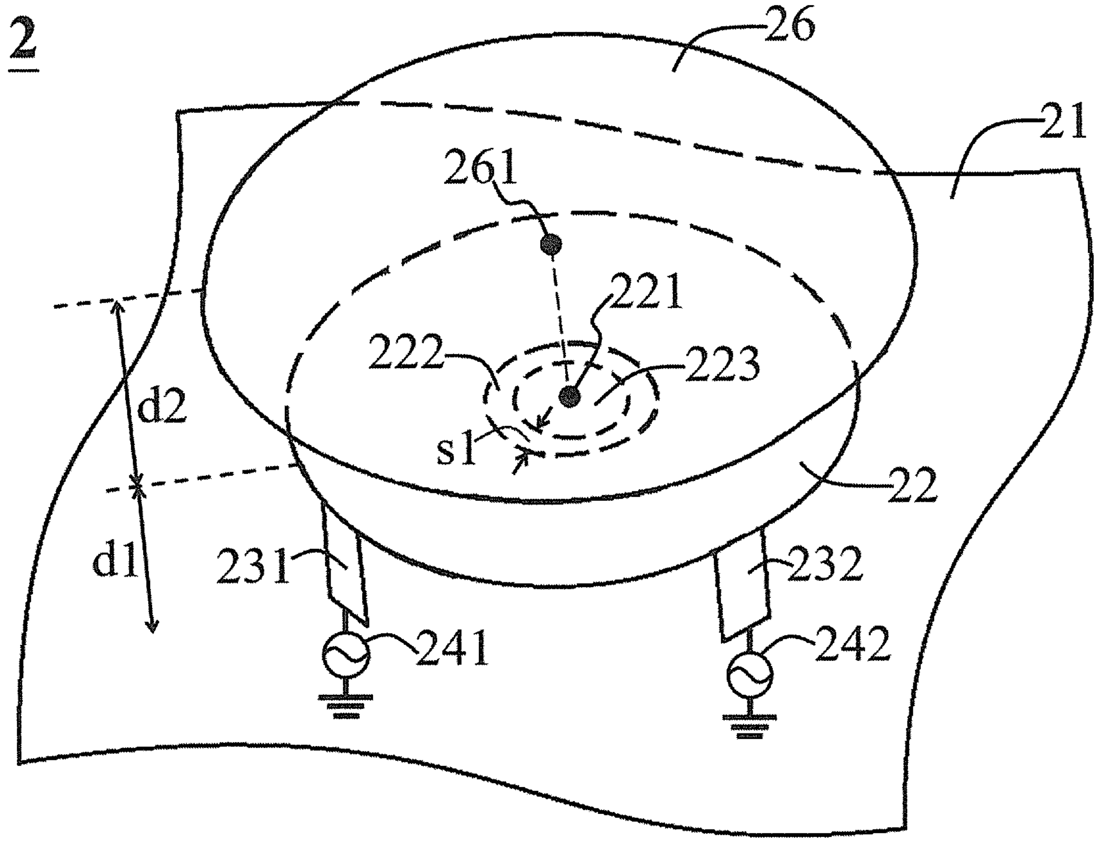
FIG. 2A is a structural diagram of an integrated multi-feed antenna 2 according to an embodiment of the disclosure.
Figure 2B:
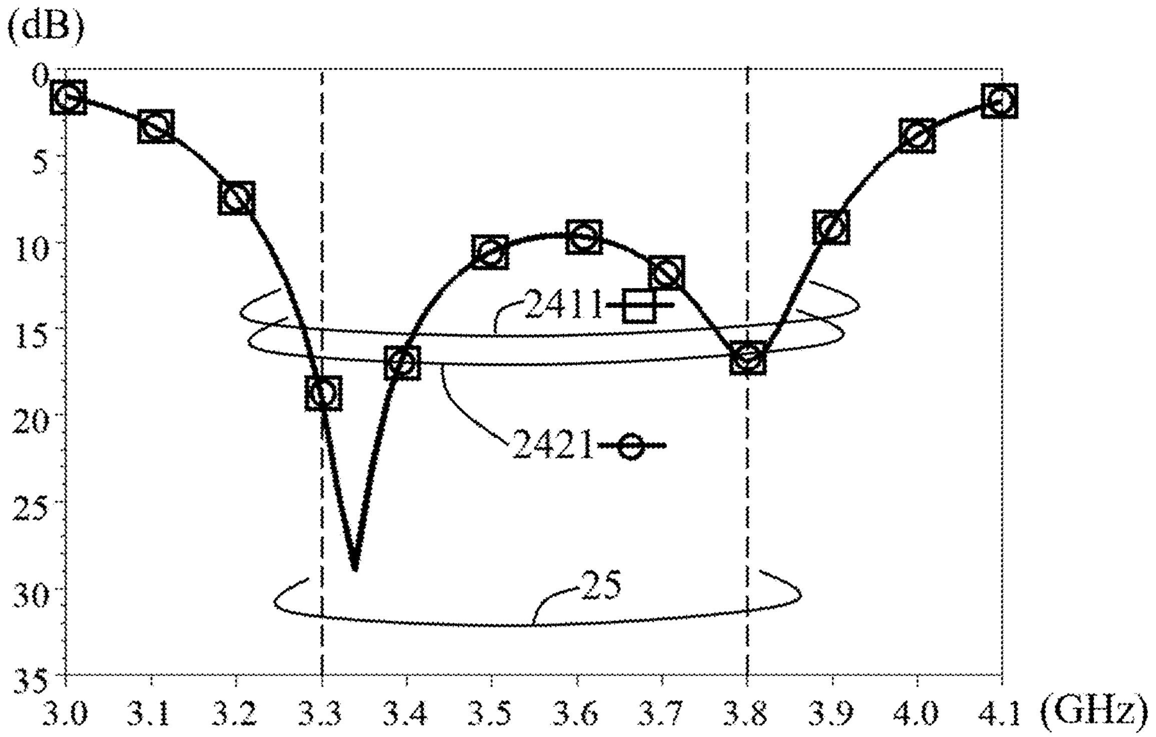
FIG. 2B is a curve diagram of return loss of the integrated multi-feed antenna 2 according to an embodiment of the disclosure.

FIG. 2A is a structural diagram of an integrated multi-feed antenna 2 according to an embodiment of the disclosure. As shown in FIG. 2A, the integrated multi-feed antenna 2 includes a first conductor layer 21, a second conductor layer 22, and a plurality of feeding conductor lines 231 and 232. The second conductor layer 22 has a first center position 221. The second conductor layer 22 also has a closed slit structure 222. The closed slit structure 222 surrounds the first center position 221 to encircle forming a center region 223. The second conductor layer 22 is spaced apart from the first conductor layer 21 at a first interval d1. Each of the feeding conductor lines 231 and 232 has one end electrically connected to the second conductor layer 22, and each has another end electrically connected to signal sources 241 and 242. Each of the feeding conductor lines 231 and 232 excites the second conductor layer 22 to generate at least one resonant mode 2411 and 2421. The resonant modes 2411 and 2421 cover at least one identical wireless communication band 25 (such as shown in FIG. 2B). The integrated multi-feed antenna 2 in this embodiment also has a third conductor layer 26. The second conductor layer 22 is located between the first conductor layer 21 and the third conductor layer 26. The third conductor layer 26 is spaced apart from the second conductor layer 22 at a second interval d2. The second interval d2 is between 0.011 wavelength and 0.23 wavelength of a lowest operating frequency of the wireless communication band 25. An area of the third conductor layer 26 is less than an area of the first conductor layer 21, and the area of the third conductor layer 26 is between 0.13 wavelength squared and 0.83 wavelength squared of the lowest operating frequency of the wireless communication band 25. The third conductor layer 26 has a second center position 261, and the second center position 261 is aligned with the first center position 221 of the second conductor layer 22.

Figure 3:
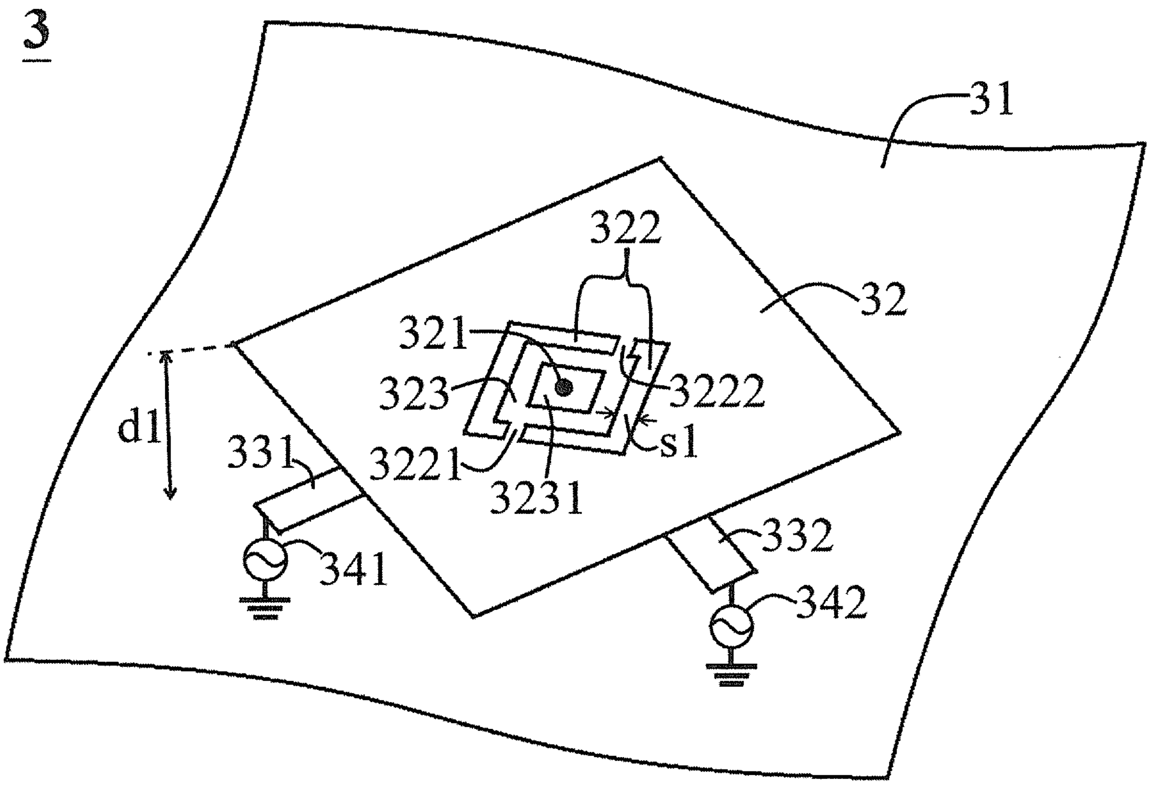
FIG. 3 is a structural diagram of an integrated multi-feed antenna 3 according to an embodiment of the disclosure.

The closed slit structure 222 has a slit interval s1. The slit interval s1 is between 0.001 wavelength and 0.08 wavelength of the lowest operating frequency of the wireless communication band 25 (as shown in FIG. 2B, 3.3 GHz to 3.8 GHZ). An area of the center region 223 is less than an area of the second conductor layer 22, and the area of the center region 223 is between 0.01 times and 0.43 times of the area of the second conductor layer 22. The area of the second conductor layer 22 is less than the area of the first conductor layer 21, and the area of the second conductor layer 22 is between 0.13 wavelength squared and 0.79 wavelength squared of the lowest operating frequency of the wireless communication band 25. The area of the center region 223 is between 0.018 wavelength squared and 0.35 wavelength squared of the lowest operating frequency of the wireless communication band 25. The number of feeding conductor lines 231 and 232 is two. The number of feeding conductor lines 231 and 232 is greater than 1 and less than or equal to 5. The feeding conductor lines 231 and 232 are located between the first conductor layer 21 and the second conductor layer 22. Each of the feeding conductor lines 231 and 232 has one end electrically coupled to the second conductor layer 22. The first interval d1 is between 0.0023 wavelength and 0.29 wavelength of the lowest operating frequency of the wireless communication band 25. The signal sources 241 and 242 are transmission lines, impedance matching circuits, amplifier circuits, feeding networks, switch circuits, connector components, filter circuits, integrated circuit chips, or radio frequency front-end modules. In practical applications, the integrated multi-feed antenna 2 may be manufactured and assembled using, but is not limited to, a circuit board process, a conductor cutting process, a plastic injection molding process, and a plastic metallization process. The integrated multi-feed antenna 2 may be provided with a plurality of sets to form an integrated multi-feed antenna array, which may be applied to multi-input multi-output antenna systems, pattern switching antenna systems, or beam forming antenna systems, or increase radiating gain through electrical connection of transmission lines or radio frequency feeding networks.

Figure 2C:
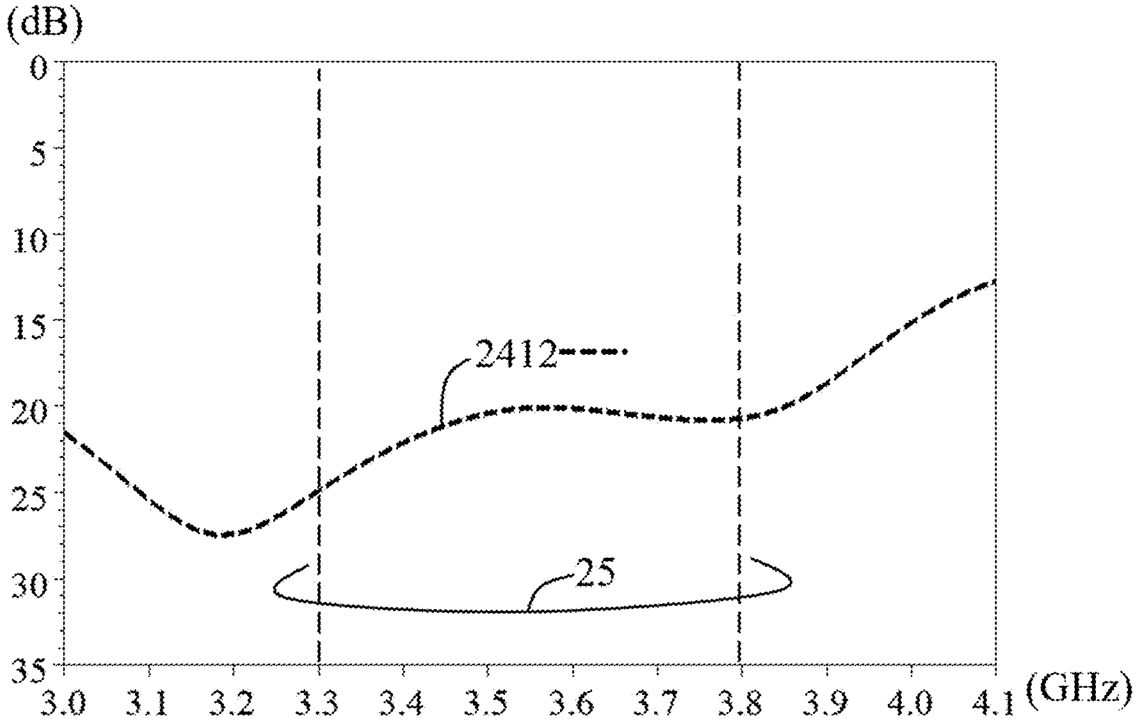
FIG. 2C is a curve diagram of isolation of the integrated multi-feed antenna 2 according to an embodiment of the disclosure.

In FIG. 2A, in the integrated multi-feed antenna 2 according to an embodiment of the disclosure, each of the feeding conductor lines 231 and 232 is designed to be electrically connected to the second conductor layer 22. It is designed to have the third conductor layer 26. The second conductor layer 22 is located between the first conductor layer 21 and the third conductor layer 26, which is not exactly the same as the integrated multi-feed antenna 1 in the embodiment. However, in the integrated multi-feed antenna 2, the second conductor layer 22 is also designed to have the closed slit structure 222, and the closed slit structure 222 is designed to surround the first center position 221 to encircle forming the center region 223. The closed slit structure 222 is also designed to have the slit interval s1. The slit interval s1 is between 0.001 wavelength and 0.08 wavelength of the lowest operating frequency of the wireless communication band 25, which could also effectively suppress an energy coupling level of resonant currents at the second conductor layer 22 excited by the feeding conductor lines 231 and 232, and successfully achieve good isolation between the resonant modes 2411 and 2421 (as shown in FIG. 2C), achieving technical effects of co-construction and integration of the signal sources 241 and 242. In addition, the area of the center region 223 is also designed to be between 0.01 times and 0.43 times the area of the second conductor layer 22. The area of the center region 223 is designed to be between 0.018 wavelength squared and 0.35 wavelength squared of the lowest operating frequency of the wireless communication band 25. Input impedance between the feeding conductor lines 231 and 232 and the second conductor layer 22 could also be optimized to successfully achieve a good impedance matching level of the resonant modes 2411 and 2421 (as shown in FIG. 2B). Therefore, the integrated multi-feed antenna 2 according to an embodiment of the disclosure could also achieve the same technical effect of multi-antenna compatible integration as the integrated multi-feed antenna 1 according to the embodiment. The integrated multi-feed antenna 2 may also be provided with multiple sets to form an integrated multi-feed antenna array, which may be applied to multi-input multi-output antenna systems, pattern switching antenna systems, or beam forming antenna systems, or increase radiating gain through electrical connection of transmission lines or radio frequency feeding networks.

Figure 2D:
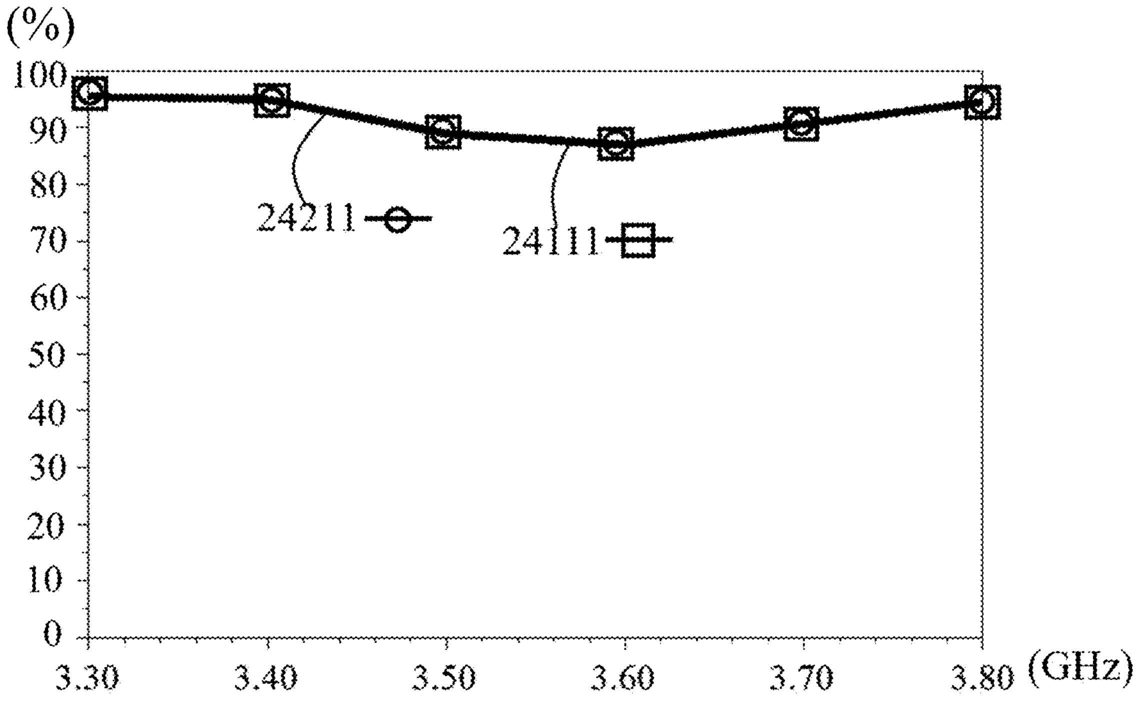
FIG. 2D is a curve diagram of radiation efficiency of the integrated multi-feed antenna 2 according to an embodiment of the disclosure.

FIG. 2B is a curve diagram of return loss of the integrated multi-feed antenna 2 according to an embodiment of the disclosure. A circuit board (a Dk value is approximately 3.48, and a Df value is approximately 0.003) is selected for implementation of production and assembly, and conducts experiments with the following dimensions. A distance of the slit interval s1 is approximately 0.33 mm. A distance of the first interval d1 is about 1 mm. The area of the center region 223 is approximately 12.6 $mm^2$. The area of the second conductor layer 22 is approximately 530.7 $mm^2$. The area of the third conductor layer 26 is approximately 855.3 $mm^2$. A distance of the second interval d2 is approximately 5.5 mm. As shown in FIG. 2B, each of the feeding conductor lines 231 and 232 successfully excites the second conductor layer 22 to generate the at least one resonant mode 2411 and 2421 with good impedance matching (as shown in FIG. 2B), covering the at least one identical wireless communication band 25 (as shown in FIG. 2B, 3.3 GHz to 3.8 GHZ). In this embodiment, a frequency range of the wireless communication band 25 is 3.3 GHZ to 3.8 GHZ, and the lowest operating frequency of the first communication band 25 is 3.3 GHZ. FIG. 2C is a curve diagram of isolation of the integrated multi-feed antenna 2 according to an embodiment of the disclosure. As shown in FIG. 2C, a curve of isolation between the signal source 241 and the signal source 242 is 2412. As shown in FIG. 2C, good isolation may be achieved between the multiple signal source 241 and signal source 242 of the integrated multi-feed antenna 2. FIG. 2D is a curve diagram of radiation efficiency of the integrated multi-feed antenna 2 according to an embodiment of the disclosure. A curve of radiation efficiency of the signal source 241 is 24111, and a curve of radiation efficiency of the signal source 242 is 24211. As shown in FIG. 2D, the resonant modes 2411 and 2421 of the integrated multi-feed antenna 2 could both achieve good radiation efficiency.

The operation of the communication band and experimental data covered in FIGS. 2B, 2C, and 2D are only for the purpose of experimentally proving technical effects of the integrated multi-feed antenna 2 according to an embodiment of the disclosure in FIG. 2A. It is not used to limit the operation of the communication band, applications, and specifications that the integrated multi-feed antenna 2 in the disclosure may cover in the practical applications. The integrated multi-feed antenna 2 may be provided with a plurality of sets to form an integrated multi-feed antenna array, which may be applied to multi-input multi-output antenna systems, pattern switching antenna systems, or beam forming antenna systems, or increase radiating gain through electrical connection of transmission lines or radio frequency feeding networks.

FIG. 3 is a structural diagram of an integrated multi-feed antenna 3 according to an embodiment of the disclosure. As shown in FIG. 3, the integrated multi-feed antenna 3 includes a first conductor layer 31, a second conductor layer 32, and a plurality of feeding conductor lines 331 and 332. The second conductor layer 32 has a first center position 321. The second conductor layer 32 also has a closed slit structure 322. The closed slit structure 322 surrounds the first center position 321 to encircle and form a center region 323. The center region 323 has a center slot structure 3231. The closed slit structure 322 has two electrically short-circuiting structures 3221 and 3222. The electrically short-circuiting structures 3221 and 3222 are electrically connected to the center region 323 and the second conductor layer 32. The second conductor layer 32 is spaced apart from the first conductor layer 31 at a first interval d1. Each of the feeding conductor lines 331 and 332 has one end electrically connected to the second conductor layer 32, and each has another end electrically connected to signal sources 341 and 342. Each of the feeding conductor lines 331 and 332 excites the second conductor layer 32 to generate at least one resonant mode. The resonant modes cover at least one identical wireless communication band.

The closed slit structure 322 has a slit interval s1. The slit interval s1 is between 0.001 wavelength and 0.08 wavelength of a lowest operating frequency of the wireless communication band. An area of the center region 323 is less than an area of the second conductor layer 32, and is between 0.01 times and 0.43 times of the area of the second conductor layer 32. The area of the second conductor layer 32 is less than an area of the first conductor layer 31, and the area of the second conductor layer 32 is between 0.13 wavelength squared and 0.79 wavelength squared of the lowest operating frequency of the wireless communication band. The area of the center region 323 is between 0.018 wavelength squared and 0.35 wavelength squared of the lowest operating frequency of the wireless communication band. The number of feeding conductor lines 331 and 332 is two. The number of feeding conductor lines 331 and 332 is greater than 1 and less than or equal to 5. Each of the feeding conductor lines 331 and 332 has one end electrically connected to the second conductor layer 32. The feeding conductor lines 331 and 332 are parallel to the second conductor layer 32. The feeding conductor lines 331 and 332 may also be disposed between the first conductor layer 31 and the second conductor layer 32, and be parallel to the second conductor layer 32 and have a coupling interval from the second conductor layer 32. The first interval d1 is between 0.0023 wavelength and 0.29 wavelength of the lowest operating frequency of the wireless communication band. The signal sources 341 and 342 are transmission lines, impedance matching circuits, amplifier circuits, feeding networks, switch circuits, connector components, filter circuits, integrated circuit chips, or radio frequency front-end modules. In practical applications, the integrated multi-feed antenna 3 may be manufactured and assembled using, but is not limited to, a circuit board process, a conductor cutting process, a plastic injection molding process, and a plastic metallization process. The integrated multi-feed antenna 3 may be provided with multiple sets to form an integrated multi-feed antenna array, which may be applied to multi-input multi-output antenna systems, pattern switching antenna systems, or beam forming antenna systems, or increase radiating gain through electrical connection of transmission lines or radio frequency feeding networks.

In FIG. 3, in the integrated multi-feed antenna 3 according to an embodiment of the disclosure, each of the feeding conductor lines 331 and 332 is designed to be electrically connected to the second conductor layer 32, and be parallel to the second conductor layer 32. The center region 323 is designed to have the center slot structure 3231. In addition, the closed slit structure 322 is designed to have the two electrically short-circuiting structures 3221 and 3222, and a shape of the second conductor layer 32 is square, which is not exactly the same as the integrated multi-feed antenna 1 in the embodiment. However, in the integrated multi-feed antenna 3, the second conductor layer 32 is also designed to have the closed slit structure 322, and the closed slit structure 322 is also designed to surround the first center position 321 to encircle and form the center region 323. The closed slit structure 322 is also designed to have the slit interval s1. The slit interval s1 is between 0.001 wavelength and 0.08 wavelength of the lowest operating frequency of the wireless communication band, which could also effectively suppress an energy coupling level of resonant currents at the second conductor layer 32 excited by the feeding conductor lines 331 and 332, and could also successfully achieve good isolation between the resonant modes, achieving technical effects of co-construction and integration of the multiple signal sources 341 and 342. In addition, the area of the center region 323 is also designed to be between 0.01 times and 0.43 times the area of the second conductor layer 32. The area of the center region 323 is also designed to be between 0.018 wavelength squared and 0.35 wavelength squared of the lowest operating frequency of the wireless communication band. Hence, input impedance between the feeding conductor lines 331 and 332 and the second conductor layer 32 could also be optimized to successfully achieve a good impedance matching level of the resonant modes. Therefore, the integrated multi-feed antenna 3 according to an embodiment of the disclosure could also achieve the same technical effect of multi-antenna compatible integration as the integrated multi-feed antenna 1 according to the embodiment. The integrated multi-feed antenna 3 may also be provided with a plurality of sets to form an integrated multi-feed antenna array, which may be applied to multi-input multi-output antenna systems, pattern switching antenna systems, or beam forming antenna systems, or increase radiating gain through electrical connection of transmission lines or radio frequency feeding networks.

FIG. 4 is a structural diagram of an integrated multi-feed antenna 4 according to an embodiment of the disclosure. As shown in FIG. 4, the integrated multi-feed antenna 4 includes a first conductor layer 41, a second conductor layer 42, and a plurality of feeding conductor lines 431, 432, and 433. The second conductor layer 42 has a first center position 421. The second conductor layer 42 also has a closed slit structure 422. The closed slit structure 422 surrounds the first center position 421 to encircle and form a center region 423. The center region 423 is electrically connected to the first conductor layer 41 through a grounding conductor line 4232. The second conductor layer 42 is spaced apart from the first conductor layer 41 at a first interval d1. The shape of the second conductor layer 42 is substantially circular. Each of the feeding conductor lines 431, 432, and 433 has one end electrically connected to the second conductor layer 42, and each has another end electrically connected to signal sources 441, 442, and 443. Each of the feeding conductor lines 431, 432, and 433 excites the second conductor layer 42 to generate at least one resonant mode. The multiple resonant modes cover at least one identical wireless communication band. The integrated multi-feed antenna 4 in this embodiment has a third conductor layer 46. The second conductor layer 42 is located between the first conductor layer 41 and the third conductor layer 46. The third conductor layer 46 is spaced apart from the second conductor layer 42 at a second interval d2. The third conductor layer 46 is substantially square in shape. The second interval d2 is between 0.011 wavelength and 0.23 wavelength of a lowest operating frequency of the wireless communication band. An area of the third conductor layer 46 is less than an area of the first conductor layer 41, and the area of the third conductor layer 46 is between 0.13 wavelength squared and 0.83 wavelength squared of the lowest operating frequency of the wireless communication band. The third conductor layer 46 has a second center position 461, and the second center position 461 is aligned with the first center position 421 of the second conductor layer 42.

The closed slit structure 422 has a slit interval s1. The slit interval s1 is between 0.001 wavelength and 0.08 wavelength of the lowest operating frequency of the wireless communication band. An area of the center region 423 is less than an area of the second conductor layer 42, and is between 0.01 times and 0.43 times of the area of the second conductor layer 42. The area of the second conductor layer 42 is less than the area of the first conductor layer 41, and the area of the second conductor layer 42 is between 0.13 wavelength squared and 0.79 wavelength squared of the lowest operating frequency of the wireless communication band. The area of the center region 423 is between 0.018 wavelength squared and 0.35 wavelength squared of the lowest operating frequency of the wireless communication band. The number of feeding conductor lines 431, 432, and 433 is three. The number of feeding conductor lines 431, 432, and 433 is greater than 1 and less than or equal to 5. The feeding conductor lines 431, 432, and 433 are located between the first conductor layer 41 and the second conductor layer 42. Each of the feeding conductor lines 431, 432, and 433 has one end electrically connected to the second conductor layer 42. The first interval d1 is between 0.0023 wavelength and 0.29 wavelength of the lowest operating frequency of the wireless communication band. The signal sources 441, 442, and 443 are transmission lines, impedance matching circuits, amplifier circuits, feeding networks, switch circuits, connector components, filter circuits, integrated circuit chips, or radio frequency front-end modules. In practical applications, the integrated multi-feed antenna 4 may be manufactured and assembled using, but is not limited to, a circuit board process, a conductor cutting process, a plastic injection molding process, and a plastic metallization process. The integrated multi-feed antenna 4 may be provided with multiple sets to form an integrated multi-feed antenna array, which may be applied to multi-input multi-output antenna systems, pattern switching antenna systems, or beam forming antenna systems, or increase radiating gain through electrical connection of transmission lines or radio frequency feeding networks.

In FIG. 4, in the integrated multi-feed antenna 4 according to an embodiment of the disclosure, each of the feeding conductor lines 431, 432, and 433 is designed to be electrically connected to the second conductor layer 42, and the center region 423 is designed to be electrically connected to the first conductor layer 41 through the grounding conductor line 4232. It is designed to have the third conductor layer 46. The second conductor layer 42 is located between the first conductor layer 41 and the third conductor layer 46, which is not exactly the same as the integrated multi-feed antenna 1 in the embodiment. However, in the integrated multi-feed antenna 4, the second conductor layer 42 is also designed to have the closed slit structure 422, and the closed slit structure 422 is designed to surround the first center position 421 to encircle forming the center region 423. The closed slit structure 422 is designed to have the slit interval s1. The slit interval s1 is between 0.001 wavelength and 0.08 wavelength of the lowest operating frequency of the wireless communication band, which could also effectively suppress an energy coupling level of resonant currents at the second conductor layer 42 excited by the feeding conductor lines 431, 432, and 433, and successfully achieve good isolation between the resonant modes, also achieving technical effects of co-construction and integration of the multiple signal sources 441, 442, and 443. In addition, the area of the center region 423 is designed to be between 0.01 times and 0.43 times the area of the second conductor layer 42. The area of the center region 423 is designed to be between 0.018 wavelength squared and 0.35 wavelength squared of the lowest operating frequency of the wireless communication band. Hence, the input impedance between the feeding conductor lines 431, 432, and 433 and the second conductor layer 42 could also be optimized to successfully achieve a good impedance matching level of the resonant modes. Therefore, the integrated multi-feed antenna 4 according to an embodiment of the disclosure could also achieve the same technical effect of multi-antenna compatible integration as the integrated multi-feed antenna 1 according to the embodiment. The integrated multi-feed antenna 4 may also be provided with a plurality of sets to form an integrated multi-feed antenna array, which may be applied to multi-input multi-output antenna systems, pattern switching antenna systems, or beam forming antenna systems, or increase radiating gain through electrical connection of transmission lines or radio frequency feeding networks.

Figure 5:
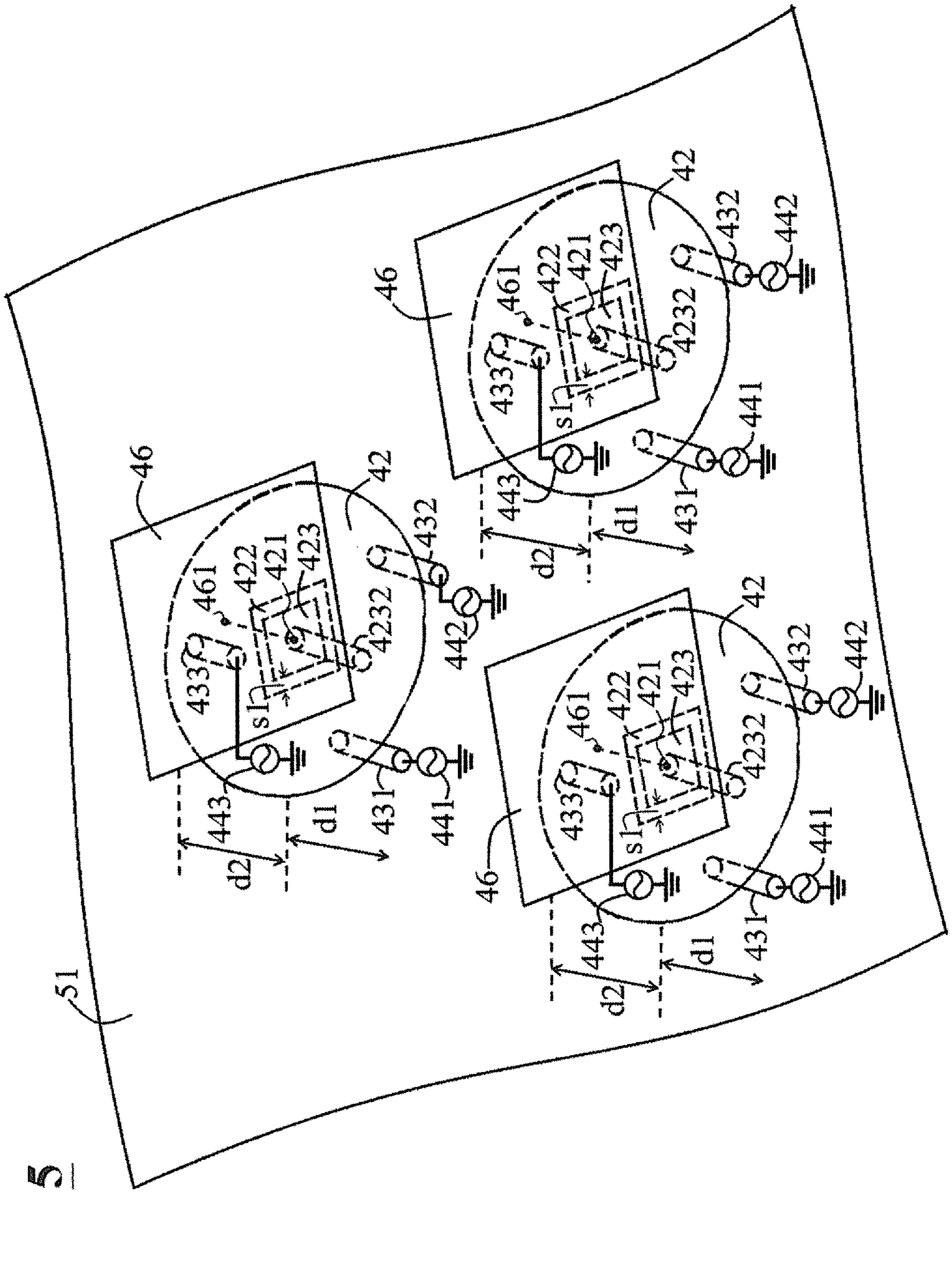
FIG. 5 is a structural diagram of the integrated multi-feed antenna 4 provided with a plurality of sets to form an integrated multi-feed antenna array 5 according to an embodiment of the disclosure.

FIG. 5 is a structural diagram of three sets of the integrated multi-feed antenna 4 (as shown in FIG. 4) forming an integrated multi-feed antenna array 5 according to an embodiment of the disclosure. The signal sources could be transmission lines, impedance matching circuits, amplifier circuits, feeding networks, switch circuits, connector components, filter circuits, integrated circuit chips, or radio frequency front-end modules. In practical applications, the integrated multi-feed antenna 5 may be manufactured and assembled using, but is not limited to, a circuit board process, a conductor cutting process, a plastic injection molding process, and a plastic metallization process. The integrated multi-feed antenna 5 may be applied to multi-input multi-output antenna systems, pattern switching antenna systems, or beam forming antenna systems, or increase radiating gain through electrical connection of transmission lines or radio frequency feeding networks. FIG. 5 is only one of the embodiments of the integrated multi-feed antenna provided with multiple sets to form the integrated multi-feed antenna array in the disclosure. It is not used to limit the number, combination, shape and arrangement of the integrated multi-feed antenna array that may be combined in practical application situations.

Based on the above, although the disclosure has been disclosed in the above embodiments, the embodiments are not intended to limit the disclosure. Those skilled in the art to which the disclosure belongs may make some changes and modifications without departing from the spirit and scope of the disclosure. Therefore, the protection scope of the disclosure shall be defined by the appended claims.

What is claimed is:

1. An integrated multi-feed antenna, comprising:

a first conductor layer;

a second conductor layer, having a first center position, wherein the second conductor layer has a closed slit structure, the closed slit structure surrounds the first center position to encircle forming a center region, and the second conductor layer is spaced apart from the first conductor layer at a first interval;

a plurality of feeding conductor lines, wherein each of the feeding conductor lines has one end electrically connected or electrically coupled to the second conductor layer, and each has another end electrically connected to a signal source, each of the feeding conductor lines excites the second conductor layer to generate at least one resonant mode, and the resonant modes cover at least one identical wireless communication band.

2. The integrated multi-feed antenna according to claim 1, wherein the closed slit structure has a slit interval, and the slit interval is between 0.001 wavelength and 0.08 wavelength of a lowest operating frequency of the wireless communication band.

3. The integrated multi-feed antenna according to claim 1, wherein an area of the center region is less than an area of the second conductor layer, and is between 0.01 times and 0.43 times of the area of the second conductor layer.

4. The integrated multi-feed antenna according to claim 1, wherein an area of the second conductor layer is less than an area of the first conductor layer, and the area of the second conductor layer is between 0.13 wavelength squared and 0.79 wavelength squared of a lowest operating frequency of the wireless communication band.

5. The integrated multi-feed antenna according to claim 1, wherein an area of the center region is between 0.018 wavelength squared and 0.35 wavelength squared of a lowest operating frequency of the wireless communication band.

6. The integrated multi-feed antenna according to claim 1, wherein a number of the feeding conductor lines is greater than 1 and less than or equal to 5.

7. The integrated multi-feed antenna according to claim 1, wherein the feeding conductor lines are located between the first conductor layer and the second conductor layer or parallel to the second conductor layer.

8. The integrated multi-feed antenna according to claim 1, wherein each of the feeding conductor lines has one end electrically coupled to the second conductor layer, and there is a coupling interval between each of the feeding conductor lines and the second conductor layer.

9. The integrated multi-feed antenna according to claim 8, wherein the coupling interval is between 0.005 wavelength and 0.19 wavelength of a lowest operating frequency of the wireless communication band.

10. The integrated multi-feed antenna according to claim 1, wherein the first interval is between 0.0023 wavelength and 0.29 wavelength of a lowest operating frequency of the wireless communication band.

11. The integrated multi-feed antenna according to claim 1, wherein there is a third conductor layer, the second conductor layer is located between the first conductor layer and the third conductor layer, and the third conductor layer is spaced apart from the second conductor layer at a second interval.

12. The integrated multi-feed antenna according to claim 11, wherein the second interval is between 0.011 wavelength and 0.23 wavelength of a lowest operating frequency of the wireless communication band.

13. The integrated multi-feed antenna according to claim 11, wherein an area of the third conductor layer is less than an area of the first conductor layer, and the area of the third conductor layer is between 0.13 wavelength squared and 0.83 wavelength squared of a lowest operating frequency of the wireless communication frequency band.

14. The integrated multi-feed antenna according to claim 11, wherein the third conductor layer has a second center position, and the second center position is aligned with the first center position of the second conductor layer.

15. The integrated multi-feed antenna according to claim 1, wherein the center region is electrically connected to the first conductor layer through a grounding conductor line.

16. The integrated multi-feed antenna according to claim 1, wherein the center region has a center slot structure.

17. The integrated multi-feed antenna according to claim 1, wherein the closed slit structure has at least one electrically short-circuiting structure.

18. The integrated multi-feed antenna according to claim 1, wherein the signal source is a transmission line, an impedance matching circuit, an amplifier circuit, a feeding network, a switch circuit, a connector component, a filter circuit, an integrated circuit chip, or a radio frequency front-end module.

19. The integrated multi-feed antenna according to claim 1, wherein the integrated multi-feed antenna is provided with a plurality of sets to form an integrated multi-feed antenna array that is applied to a multi-input multi-output antenna system, a pattern switching antenna system, or a beam forming antenna system, or increases radiating gain through electrical connection of transmission lines or radio frequency feeding networks.

* * * * *